May 24, 1938. E. A. STULLER 2,118,576
EMERGENCY TIRE CHAIN UNIT
Filed Aug. 24, 1935
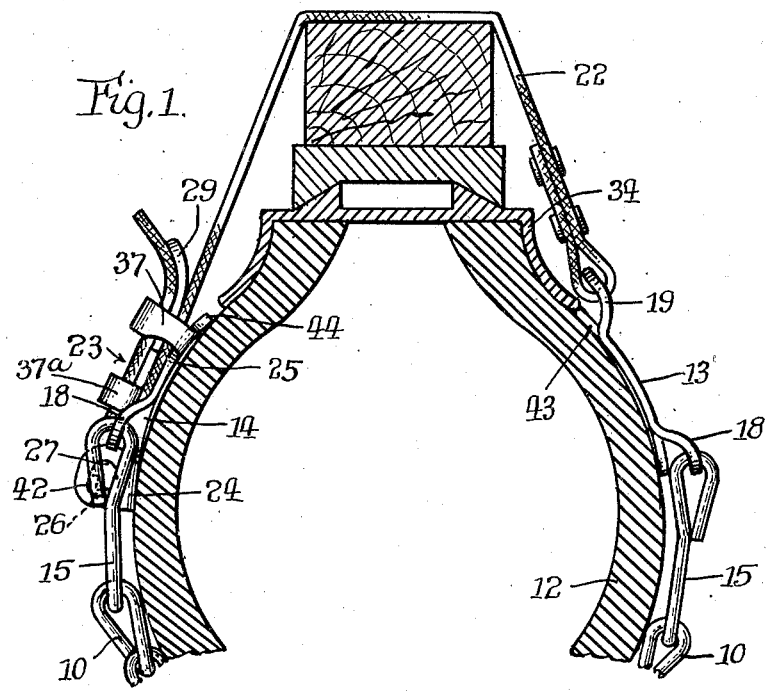
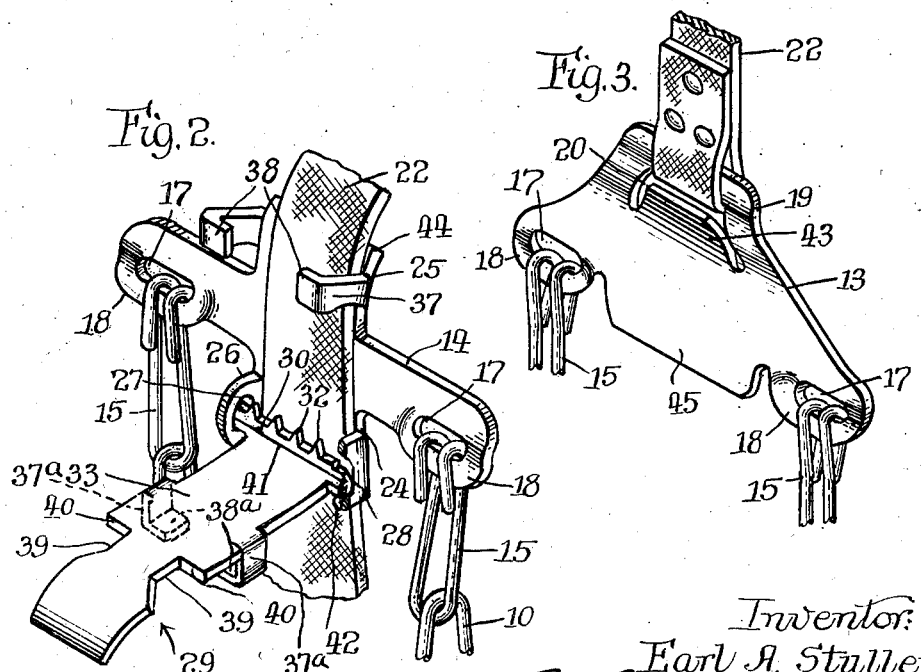
Inventor:
Earl A. Stuller Patented May 24, 1938

2,118,576

UNITED STATES PATENT OFFICE 2,118,576

EMERGENCY TIRE CHAIN UNIT

Earl A. Stuller, Chicago, Ill., assignor to Western Chain Products Co., Chicago, Ill., a corporation of Illinois Application August 24, 1935, Serial No. 37,627

20 Claims. (Cl. 152—233)

This invention relates generally to tire chains of the type known as emergency chains comprising small units wherein one or more of the chain units may be secured about a tire without moving the vehicle or raising the wheel.

A general object of the invention is to provide a novel chain unit of this character which is strong and durable, which may be quickly and permanently secured in place, and which in operation will not slip circumferentially about the tire.

Another object resides in the provision of an emergency tire chain device embodying an improved cross bar member connected to the road engaging means of the unit substantially parallel to the side wall of the tire and having integral means thereon for engagement with the end of a flexible connecting element by which the device is secured about the wheel assembly and including a part for abutment against an outstanding portion of the wheel assembly to prevent lengthwise movement of the chain unit transversely about the wheel.

Another object is to provide an improved cross bar and fastener arrangement for emergency tire chain units in which the ends of the bar provide connections for the road engaging means of the unit and parts extending to opposite sides from the center of the bar supplement the body of the bar to provide an elongated base against which the end of a flexible fastening element may be adjustably clamped by a clamping lever of unusual length and force.

Another object is to provide an emergency chain unit which embodies improved means for engaging the rim of the wheel or a comparable part to hold the chain in proper operative position for preventing longitudinal movement or slip thereof circumferentially of the tire.

More particularly stated, another object resides in the provision of an emergency chain unit having elongated cross bars engageable with the opposite side walls of the tire and having the ends of the anti-skid chains secured near the ends of the bars, integral parts of the bars extending centrally therefrom for engagement with the wheel rim upon lengthwise movement of the chains whereby such movement is permanently arrested.

Another object is to provide a novel fastening device for an emergency tire chain unit wherein two parts, one of which constitutes a cross bar, are pivotally associated for clamping a flexible strap therebetween, the pivoted part being of an improved construction for smooth and uniform operation and enabling it properly to engage straps of different thicknesses.

A further object resides in the provision of improved means for maintaining the end of the flexible fastening strap confined against flapping or becoming caught upon or entangled in objects adjacent which the emergency unit may be moved while in use.

Other objects and advantages will become apparent from the following description taken in connection with the accompanying drawing, in which:

Figure 1 is a transverse sectional view through a tire and rim assembly showing an emergency tire chain unit embodying the features of the invention secured thereon.

Fig. 2 is a fragmentary perspective view of one of the cross bars of the tire chain unit showing the pivotally mounted part of the fastener device in open position.

Fig. 3 is a fragmentary perspective view of the opposite cross bar of the emergency chain unit.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawing wherein one form of device embodying the features of the invention is shown merely for the purpose of illustration, a plurality of chains 10 or similar road engaging members are dimensioned to fit transversely across the outer part of the vehicle wheel such as the tread portion of a tire 12. The opposite ends of the chains are connected in any suitable manner with cross bars 13 and 14 of substantially the same overall dimensions and which support the chains in spaced relation on the tire. Herein the chains are secured to the cross bars by end links 15 permanently affixed to the cross bars through apertures 17 which are located in portions 18 of the cross bars. Each of the portions 18 is preferably offset outwardly from the face plane of the cross bars to provide a clearance for the links 15, which allows the body of the cross bars to be disposed adjacent to or in contact with the underlying wall of the tire.

One of the cross bars, in this instance the cross bar 13, has extending from the side thereof opposite the portions 18, a centrally located finger 19 which is also offset outwardly from the face plane of the cross bar. An elongated aperture 20 is provided in the finger 19 and a flexible fastening member such as a woven strap 22, passes through the finger and is permanently secured upon itself. The other cross bar 14 carries a fastening device, generally indicated 23, for detachably engaging the free end of the flexible member 22 after said member has been passed through the wheel assembly to secure the chain unit in place. Cross reference is made to my copending application Serial No. 611,250, filed May 14, 1932, which claims broadly certain features disclosed herein.

By the present invention the fastening device 23 embodies an improved arrangement wherein the center portion of the body of the bar 14 is utilized as part of the base of the fastening device. To this end the bar 14 is provided with plates 24 and 25 extending from opposite sides thereof and constituting with the central portion of the bar a base for receiving the strap 22. Along its sides the plate 24 has parallel ears or flanges 26 having therein coaxial apertures 27 adapted to receive pivots 28 on a clamping lever 29. Preferably the lever 29 is in the form of a wide bell crank lever having a short arm 30 provided with projections 32, and a long arm 33 having an outwardly curved end by which the user manipulates the lever. The unusually long arm 33 extends across the body of the bar 14 and over the plate 25 between narrow outstanding ears or flanges 37 thereon.

To affix the emergency unit about the wheel assembly, the road engaging members 10 are positioned across the tread of the tire with the bars 13 and 14 occupying positions substantially parallel to the side walls of the tire on opposite sides thereof adjacent to an outstanding part of the wheel assembly such as the margins of the tire supporting rim 34. The strap 22 is then passed across the inside of the wheel and its free end carried between the flanges 37 and inserted between the short arm 30 of the bell crank lever and the plate 24. Thereupon, the assembly is drawn taut and the long arm 33 of the lever pressed toward the body of the bar into a position along the strap so as to clamp the strap against the base provided by the bar and plates and to move the short arm 30 and the projections 32 thereon into binding engagement with the strap. The free end of the strap may then be bent upon itself about the clamping lever and passed beneath inturned ends 38 on the flanges 37 to hold the end against flapping and also to secure the clamping lever against accidental movement. Due to its length the clamping lever provides unusual clamping force and may withstand much greater tension in use than in prior devices.

Because of the unusual length of the clamping lever 29, and the consequent substantial spacing between its pivoted end and the flanges 37, the end of the strap 22 may have a tendency to bulge outwardly along the long arm 33 of the lever. The invention therefore contemplates an improved construction of the clamping lever, which is herein shown as including a pair of outstanding flanges 37ª having inturned ends 38ª overlying a transverse portion near the center of the long arm 33. These inturned ends 38ª serve to hold the bent-over end of the strap against the clamping lever and prevent its becoming caught upon or entangled in objects adjacent which the unit may be carried by the wheel to which it is attached.

The apertures 27 are preferably of substantial size and elongated so that the bell crank lever may be shifted longitudinally by a force tending to withdraw the flexible strap from the fastening device. Upon such movement of the lever, shoulders 40 defining one margin of alined slots 39 will be carried into abutment with the flanges 37, the edges of which may be slightly recessed to receive the shoulders and thus further secure the clamping lever against accidental opening movement.

Preferably the flexible strap 22 is fashioned of woven material, and in different lots this material has been found to vary in thickness to a considerable extent. This variation should be taken into consideration in the construction of the fastener or the fastener will cut a strap which is too thick and will not properly hold one which is too thin. In the present embodiment, the construction of the bell crank lever 29 is such that compensation for the variation in strap thickness may easily be made. Hence, the bell crank lever is preferably a stamping, and the long and short arms are formed by bending the stamping on a transverse line 41. The pivots 28 are of substantial longitudinal dimension and are located on the transverse line of bending. Thus, when the lever is formed, the pivots are also bent to produce curled or arcuate anti-friction outer surfaces 42. To compensate for strap thickness variations, the transverse line of bending 41 is shifted longitudinally to increase or decrease the length of the short arm 30 as required. In this manner, the thickness of the straps in a lot which is to be incorporated in chain units may be accurately determined before the bending operation and such adjustment in the relative position of the line 41 made as is calculated to obtain the best results.

Since in use chains of the emergency type tend to slip longitudinally of themselves, means is provided for preventing such movement. In the present instance each of the cross bars 13 and 14 is provided with stop means extending therefrom for engagement with the underlying side wall of the tire and extending in a direction which follows the contour of the side wall toward the edge of the rim 34. To this end, the body of the finger 19 near the slot 20 is struck out to form an inwardly bent stop lug 43 of substantial width to occupy an operative position adjacent the tire wall. On the cross bar 14 the plate 25 is provided with a protruding inturned end 44 adapted to function similarly as the lug 43. Desirably the plate 13 has a slightly inturned flange 45 along the side opposite the finger 19 and adapted to engage the tire wall at a point transversely spaced from the point of engagement by the lug 43 so as to insure normal contact between the tire and the edge of the lug. For a similar purpose the plate 24 may be turned inwardly to engage the underlying tire wall with an end contact.

In the course of drawing the device taut about the wheel assembly, the stops 43 and 44 will be drawn either into actual engagement with the rim 34 or into close proximity therewith. In the latter instance should the chain device slip in operation, the stop on one of the cross bars will move into engagement with the tire rim as shown in Fig. 1, thereby to prevent further movement thereof. The provision of such stops at the center part of the cross bars insures positive engagement thereof with the rim along the line through which force is applied by the connecting strap 22.

It will be apparent from the foregoing that the invention provides an improved emergency chain unit which embodies oppositely disposed improved cross bars of substantially the same size having integral central stops and that one of the bars serves as the base of a novel fastener arrangement wherein an unusually long clamping lever extends across and substantially beyond opposite sides of the bar for clamping a fastening strap against the bar, and this improvement is effected without increasing the overall dimensions of the cross bar and buckle assembly over those of similar assemblies now in commercial use. Through the foregoing and other features the invention provides a chain unit which is highly efficient in operation, is simple to affix and adjust about a wheel assembly, is positively maintained in its proper relationship on the tire, is simple in construction, and may be manufactured and sold at a relatively low cost.

This application is a continuation in part of my copending application Serial No. 672,909 filed May 26, 1933, now Patent No. 2,014,151 issued September 10, 1935.

I claim as my invention:

1. In an emergency unit of the character described, the combination of road engaging means adapted to fit transversely across the tread portion of a tire, elongated cross plates having outwardly offset portions near their opposite ends on one longitudinal edge connected to said engaging means, said plates occupying positions substantially paralleling the side walls of the tire on opposite sides thereof adjacent to the margins of the tire supporting rim and having on their remaining longitudinal edges transversely extending integral portions of substantial width, detachable means for securing the unit in place arranged to extend from one cross member to the other through the wheel assembly and being in engagement with said portions, and parts integral with said portions and substantially underlying said detachable means when the unit is assembled with the wheel assembly, said parts being turned inwardly for engagement with the adjacent underlying side walls of the tire and extending in a direction which follows the contour of said side walls toward the outstanding parts of said rim near the convergence of the tire therewith for maintaining the unit against longitudinal movement around the tire.

2. In an emergency tire chain unit, the combination of a pair of elongated cross bars of substantial width and adapted to lie against the opposite walls of a tire near projecting portions of the wheel assembly, road engaging means adapted to fit transversely across the tread of the tire and secured along one side edge of each cross bar, connection means located centrally of each cross bar and spaced outwardly from the tire engaging surfaces of the respective bars, flexible means extending between said connection means for operatively securing the device about a tire and wheel assembly, and inwardly turned stops centrally integral and rigid with each cross bar on a line substantially coincident with the line of force applied through said flexible means and adapted for engagement with said projecting portions of the wheel assembly to prevent longitudinal movement of the device after it has been secured in place by said flexible means.

3. An emergency device of the character described, comprising, in combination, a pair of cross bars arranged to lie adjacent the side walls of the tire and having road engaging means extending therebetween, means for operatively securing the device about a tire and wheel assembly, parts integral with said cross bars and spaced from the side wall of the tire for engagement by said means, stop members of substantial width extending from the center of said cross bars along one side and projecting inwardly therefrom for engagement with the adjacent underlying side wall of the tire and extending in a direction which follows the contour of said side wall toward an outstanding part of the wheel assembly near the convergence of the tire therewith to prevent endwise movement of the device around the tire, and integral means along the opposite sides of said cross bars turned inwardly into edge contact with the tire walls at points spaced transversely from said stop members and adapted to maintain the normal engagement of the latter with the tire by maintaining a slightly spaced relation between the intermediate body portions of the bars and the tire walls.

4. A cross bar for an emergency device of the character described, comprising a substantially flattened, elongated bar having on one longitudinal edge an outwardly extending integral member for engagement by a connecting element, said member having an aperture formed therein, and a part of the body of said member along said aperture being struck out to form an inwardly projecting stop lug adapted for engagement with an outstanding part of the wheel assembly.

5. A cross bar for an emergency tire chain unit comprising a flattened, elongated metallic plate having means near the opposite ends thereof for attachment of road engaging means, a finger of substantial width extending from a central portion along one side of the bar and offset outwardly from the plane of the body of the bar, an aperture formed in said finger for receiving an attachment strap or the like, a stop lug struck out of the body of said finger along said aperture and extending inwardly into the plane of the body of the bar for engagement with an outstanding part of a wheel assembly, and a slightly inturned flange along the opposite side of said bar for engaging the wall of the tire at a point transversely spaced from said lug and adapted for maintaining the intermediate portion of the body of the bar in spaced relation to the tire for insuring normal contact of the lug therewith.

6. A cross bar for an emergency tire chain unit of the character described comprising an elongated bar adapted near its opposite ends for attachment of road engaging means, oppositely extending integral plates on the sides of said bar, means on one of said plates providing pivot bearings, a lever having oppositely projecting pivots on one end and engaging within said bearings, means on said lever for gripping a fastening member inserted between the lever and the body of one plate, and means on the remaining plate adapted to be engaged by said lever in closed position to maintain the lever against accidental opening movement.

7. In combination in an emergency device embodying road engaging means adapted to fit transversely across the tread of a tire and flexible means for securing the road engaging means about a wheel assembly, means for connecting the road engaging means and flexible means and maintaining the same under tension comprising an elongated bar adapted to lie substantially parallel with a side wall of the tire adjacent an outstanding element of the wheel assembly, oppositely extending parts on the central portion of the bar constituting together with said portion a base for receiving the end of said flexible means, a long lever connected to one of said parts and extending across said base for clamping said flexible means forcibly thereagainst, and inturned means on the part extending from the side of said bar nearest said outstanding wheel element adapted to contact the underlying tire wall and movable toward engagement with said outstanding element to prevent endwise movement of the device around the tire after the device is placed under tension by said flexible means.

8. In combination in an emergency device embodying road engaging means adapted to fit transversely across the tread of a tire and flexible means for securing the road engaging means about a tire assembly, means for connecting the road engaging means and flexible means comprising an elongated bar adapted to lie substantially parallel to the side wall of the tire, oppositely extending means on the central part of the bar constituting together with the body of the bar a base over which the end of said flexible means is adapted to be passed, and a long lever extending between said oppositely extending means across said base for clamping said flexible means against the base with substantial force.

9. In an emergency tire chain unit having road engaging means and means for fastening said road engaging means in place including a flexible strap, an elongated bar connected to said road engaging means, a clamping lever having pivots near one end, oppositely extending portions on said bar constituting together with the central portion of the bar a base across which said lever extends in clamping position, outwardly extending means on one of said portions for engagement by the pivots of said lever, and means on the opposite portion for receiving the free end of said strap to hold the same in place over the lever for preventing accidental release of the lever after the unit has been secured in position.

10. An emergency anti-skid device of the character described embodying road engaging means combined with a flexible element for securing said means around a tire and means for connecting said road engaging means and element, said last mentioned means including an elongated plate permanently secured to said road engaging means, oppositely extending parts along the sides of the plate constituting together with the central portion of the plate a base for receiving the free end of said flexible element, and a bell crank lever having a long arm extending completely across said base and a short arm for engaging and pressing the flexible element tightly against one of said parts, said long arm being arranged to lie against and press said flexible element against the remainder of the base.

11. In an emergency tire chain having road engaging means, and means for fastening said road engaging means in place including a flexible strap, a fastening element for engagement with said strap having a pivoted bell crank lever movable bindingly to engage said strap, said lever comprising a plate so bent along a transverse line that the lever will properly engage a strap of predetermined thickness, and pivots on said plate extending across the line of bending.

12. In an emergency tire chain unit having road engaging means and means for fastening said road engaging means in place including a flexible strap, an elongated bar connected to said road engaging means, a clamping lever having pivots near one end, oppositely extending portions on said bar constituting together with the central portion of the bar a base across which said lever extends in clamping position, outwardly extending means on one of said portions for engagement by the pivots of said lever, means on the opposite portion for receiving the free end of said strap to hold the same in place over the lever for preventing accidental release of the lever after the unit has been secured in position, and outstanding means on said lever extending across the body thereof for maintaining the strap against outward bulging.

13. In a fastening device for an emergency device of the character described, means providing a base adapted to receive a flexible strap of substantial width, an elongated clamping lever pivotally connected to said base and arranged to overlie and tightly clamp the strap against the base, means for holding the lever in clamping position, and outstanding flanges on said lever having inturned ends extending in spaced relation across the body thereof and adapted to hold the bent-over end of the strap against the lever to prevent outward movement of said end.

14. A cross bar for an emergency device of the character described comprising, in combination, an elongated bar having means near its ends for connection with road engaging means, a rigid member extending centrally from a longitudinal edge of said bar to coact with means for connecting the device to a wheel assembly, said member having a part projecting inwardly for engagement with a portion of the wheel assembly adjacent the point at which the connecting means overlies said portion of the assembly and a projecting portion on the longitudinal edge of the bar opposite said member engageable with an underlying surface to maintain the bar against tilting about its axis whereby said part will remain permanently in engagement position.

15. A unitary buckle and connecting means structure for an emergency device for automobile wheels comprising, in combination, an elongated base having pivot bearing means adjacent one end and strap engaging means adjacent the opposite end, said ends being arranged to lie closely adjacent an underlying tire wall with said opposite end in position to engage a protruding portion of the wheel assembly for preventing endwise movement of the base thereby, an elongated fastening lever having pivots at one end coactive with said bearing means and arranged to extend across said base with its opposite end adjacent said engaging means whereby to fasten the end of an underlying connecting strap fixedly to said base with the free end portion of the strap reversely bent over the lever for coaction with said engaging means to maintain the lever against unfastening movement, and laterally projecting parts extending in balanced relation to opposite sides from substantially the center of said base and including portions for connecting thereto the spaced ends of road engaging members extending oppositely to the strap, the centralized disposition of said projecting parts and the eccentric relation of the pivot end of said lever thereto effecting a balanced distribution of forces in the assembly of the device with the wheel for maintaining said ends of said base in snug engagement with the tire wall.

16. In a unit of the character described, an elongated base having spaced ears at one end, an elongated clamping lever pivotally connected between said ears and arranged to extend lengthwise of said base to clamp an end portion of a fastening strap against said base, spaced ears at the opposite end of said base at least partially overlying the outermost face plane of the lever to engage the return end of the strap, and means for connecting the unit in an assembly including integrally formed parts projecting from opposite sides in the plane of said base intermediate said ears.

17. In an emergency chain device of the character described, the combination of an elongated sheet metal plate having means near its opposite ends for receiving the ends of road chains and being adapted to lie substantially parallel to the side wall of a tire, means located along the transverse centerline of the plate for receiving flexible means for connecting the device to a wheel assembly, and a stop lug integrally formed with said plate and extending laterally therefrom beyond the plane occupied by the flexible means for movement limiting engagement with an outstanding part of the wheel assembly along said transverse centerline while enabling limited transverse movement of said opposite ends of the plate relative to said outstanding part of the wheel assembly.

18. In combination in a device of the character described, means providing a base adapted to receive a flexible connecting strap, an elongated clamping lever pivotally connected to said base and arranged to overlie and secure the strap against the base, means on said base for receiving and holding the bent-over end of the strap in overlying relation to said lever to maintain the latter in strap securing position, and means on said lever for engaging the overlying portion of the strap at a spaced point relative to said first mentioned means and supplemental to the latter to hold said overlying portion of the strap close to the lever.

19. In an emergency tire chain device having road engaging means, means for fastening said road engaging means in place including a cross bar and a flexible fastening strap, means on said bar including a pair of spaced flanges adapted to receive said strap edgewise therebetween and having coaxial bearing apertures, and an elongated plate bent along a transverse line near one end thereof and forming a bell crank lever having a long leg and a short leg, oppositely extending curl pivots formed as integral parts of said lever and located on the transverse line of bending, said pivots having arcuate anti-friction outer bearing faces coactive with said flanges in said bearing apertures to permit said long arm to be moved toward an underlying portion of said strap for carrying the end of said short arm into gripping engagement with said strap.

20. In an emergency tire chain unit of the character described, in combination, a pair of elongated sheet metal stampings providing cross bars to lie in parallel relation to opposite walls of a tire near projecting portions of the wheel assembly, road engaging chains connected between the opposite ends of said cross bars to cross the tire tread, a flexible strap for connection between said cross bars across the inside of the wheel assembly and adapted to be tightened for drawing up said bars, means on a central portion of each cross bar for receiving the associated end of said strap, and an integral stop projecting rigidly from the center of the side of each cross bar opposing said projecting portions for engagement therewith to hold the device against longitudinal movement around the wheel assembly, said stops being located with respect to said strap receiving means so as to underlie said strap and extend substantially on the line and in the direction of tightening thereof so that tightening of said strap tends to tilt said stops toward such engagement with said projecting portions.

EARL A. STULLER.